Jan. 17, 1956  A. STRACHAN  2,731,378
PROCESS FOR APPLYING A LAMINATE TO SUPPORTING SURFACE
Filed Dec. 13, 1952  2 Sheets-Sheet 1

INVENTOR.
Allister Strachan
BY

Jan. 17, 1956   A. STRACHAN   2,731,378
PROCESS FOR APPLYING A LAMINATE TO SUPPORTING SURFACE
Filed Dec. 13, 1952   2 Sheets-Sheet 2

INVENTOR.
Allister Strachan
BY

United States Patent Office 2,731,378
Patented Jan. 17, 1956

2,731,378

PROCESS FOR APPLYING A LAMINATE TO SUPPORTING SURFACE

Allister Strachan, Columbus, Ohio, assignor to Midcontinent Adhesive Company, Grove City, Ohio, a corporation of Ohio Application December 13, 1952, Serial No. 325,805

4 Claims. (Cl. 154—120)

This invention relates to a process for applying a laminate to a supporting surface. It has to do, more particularly, with a process whereby the laminate is cemented to a supporting surface.

Various types of decorative laminates, for example plastic sheets, are applied to various supporting surfaces to cover such surfaces. The laminate is cemented to the supporting surface by means of a suitable cement. For example, adhesives of latex and solvent types made from natural or synthetic rubbers are used for this purpose. In applying the laminate, the surface of the laminate and the cooperating receiving surface of the support are covered with the cement which must thoroughly dry before the cooperating surfaces are brought together. Thus, it would be desirable to have some way of testing the cement before the laminate is contacted with the supporting surface. Furthermore, normally, it is necessary to accurately align the edges of the laminate with the edges of the supporting surface. This is difficult to do after the two cemented surfaces are brought into contact since they will immediately adhere to each other. Therefore, it would be desirable to provide some way of effectively aligning the laminate and the supporting surface before they adhere together.

It is the main object of this invention to provide a simple but effective process for applying a laminate to a supporting surface whereby the laminate is cemented to the surface, the process including a step for testing the condition of the cement which has been applied to the surfaces to be subsequently brought into contact, and the process also including steps for accurately aligning the laminate on the supporting surface before the cooperating surfaces are caused to adhere to each other.

The preferred process of this invention is illustrated by the accompanying drawings wherein.

Figure 1:
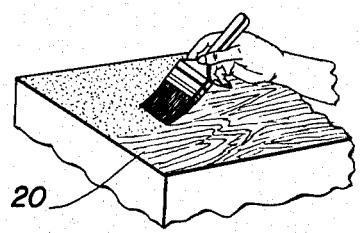
Figure 1 shows cement being applied to a supporting surface which is to receive the decorative laminate.
Figure 2:
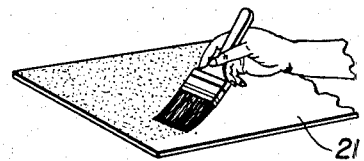
Figure 2 is a similar view showing cement being applied to the under surface of the laminate.

With reference to the drawings, there is illustrated, for example, a process by which a laminate can be applied to a flat horizontal surface. The surface is shown in Figure 1 at 20 as a wood surface but may be of other material. This surface 20 is adapted to receive a laminate 21, which may be a sheet of decorative material such as plastic. As shown in Figure 1, the surface 20 is coated with a cement and as shown in Figure 2 the one surface of the laminate 21 is coated with cement. Before coating, the laminate 21 is cut to the exact size of the surface 20 so that its edges can be brought into registry with the edges of the surface 20.

Figure 3:
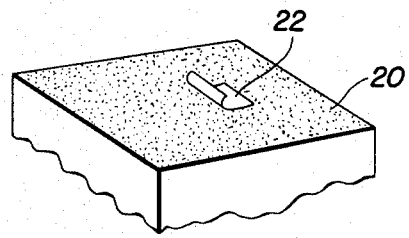
Figure 3 illustrates how either cemented surface can be tested to determine the condition of the cement.

The cement used is preferably a rubber cement. One coat is applied to each surface and is then allowed to dry, preferably for about thirty minutes. Then a second coat is applied and allowed to dry. Whether or not the cement is sufficiently dry may be determined as indicated in Figure 3. A small piece of paper 22, such as ordinary kraft wrapping paper, may be applied to the cemented surface. This paper is pressed against the cement and then pulled away and if the adhesive tends to pull away from the surface to which it is applied, the cement is not yet dry enough.

The dried cement surface will not stick to the paper without the use of considerable pressure but will readily stick to another dried cemented surface. Therefore, when the cemented surface of the laminate 21 is pressed against the cemented surface 20, these surfaces will adhere. However, to accurately align the two surfaces, the steps illustrated in Figures 5 to 9 are followed.

Figure 5:
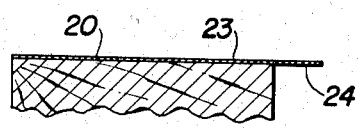
Figure 5 is a sectional view taken along line 5—5 of Figure 4.
Figure 4:
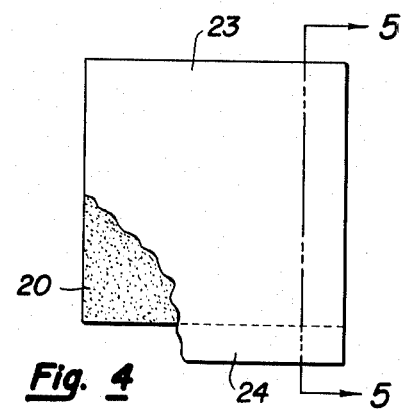
Figure 4 shows how a sheet of paper is disposed on the cemented supporting surface, extending beyond the edge thereof.
Figure 6:
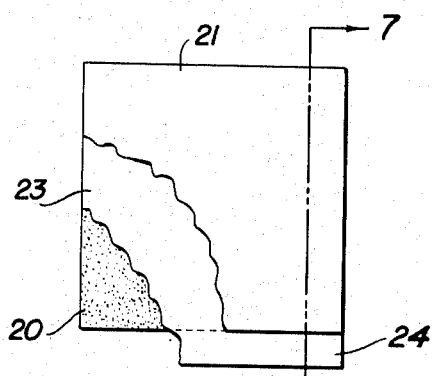
Figure 6 is a plan view, partly broken away, showing the laminate in position on the support with its cemented surface in contact with the paper sheet which has been applied to the cemented supporting surface.
Figure 7:
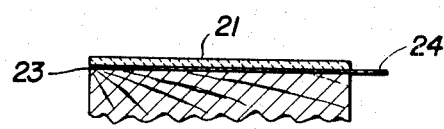
Figure 7 is a sectional view taken along line 7—7 of Figure 6.

A large sheet of flexible material 23, for example ordinary kraft wrapping paper, is applied to the cemented surface 20. This paper will be applied lightly over the surface 20 and will not stick thereto. This sheet 23 will be of exactly the same size as surface 20 except that it will have an extension 24 at one edge which will extend beyond such surface as shown in Figures 4 and 5. It will be so positioned that all of its edges coincide with the edges of the surface 23 with the exception of that edge where the extension 24 is located as shown in Figure 4. Next the laminate 21 is slid into place over the paper sheet 23, as shown in Figures 6 and 7, its edges being aligned with the edges of the sheet 23 and surface 20 with the exception of the edges located adjacent the extension 24 of the paper.

Figure 8:
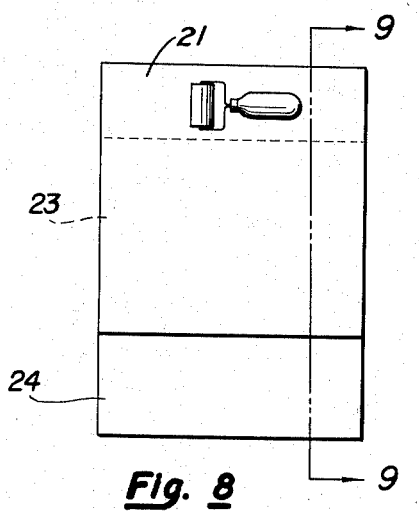
Figure 8 is a plan view showing how the paper sheet is gradually pulled from between the laminate and the supporting surface and the progressively contacting portions of the two surfaces are gradually pressed together.
Figure 9:
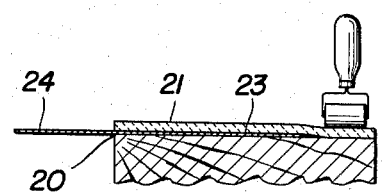
Figure 9 is a sectional view taken along 9—9 of Figure 8.

The extension 24 of the paper sheet 23 is now grasped and is pulled forwardly slowly from between the supporting surface 20 and the laminate 21 as shown in Figures 8 and 9 and the rear end of the laminate 21 is pressed downwardly progressively onto the gradually uncovered surface 20. Since these two surfaces 20 and 21 are cemented, the pressure will cause them to firmly adhere. Thus, the cemented surfaces can be slid relatively for the purpose of aligning them, with the paper sheet 23 therebetween, but as the sheet is progressively withdrawn, they will adhere immediately upon being pressed together.

Instead of using paper for the sheet 23, other flexible sheet material which will not adhere to the cemented surfaces without considerable pressure may be used.

Figure 10:
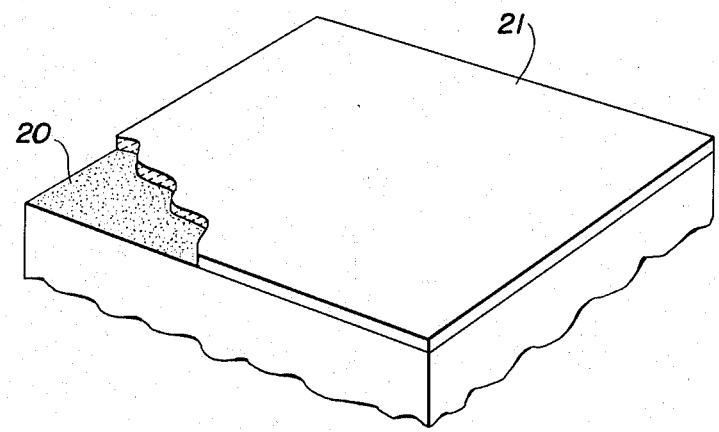
Figure 10 is a perspective view, partly broken away, showing the laminate finally positioned and cemented in place on its supporting surface.

As shown in Figure 10, the resulting product will be the laminate 21 with its edges aligning exactly with the edges of surface 20 and with the two contacting surfaces effectively bonded together.

Having thus described the invention what is claimed is:

1. The method of applying a laminate to a supporting surface with the laminate of a size to fit exactly the supporting surface which comprises applying cement to the supporting surface and applying cement to a surface of the laminate, placing a sheet of material, which will not adhere to the cemented surfaces without pressure, between the cemented surfaces which are disposed in superimposed relationship with the sheet of material having its edges coinciding with the corresponding edges of the laminate except that one of its edges extends beyond the corresponding edge of the laminate so that it can be pulled readily from between the laminate and the supporting surface, gradually withdrawing said sheet from between such surfaces by pulling on the extended edge thereof to cause portions of such surfaces to progressively contact with each other, and progressively pressing together the contacting portions of such surfaces.

2. A method according to claim 1 wherein the cemented surfaces are allowed to dry before the sheet of material is disposed therebetween, and then the condition of such surfaces is tested by pressing a piece of material thereagainst to determine if the cement will lift from the surface to which it is applied.

3. A method according to claim 2 wherein the sheet of material and the piece of material are both of paper.

4. A method according to claim 1 where the sheet of material is paper.

References Cited in the file of this patent

UNITED STATES PATENTS

| | | |
|---|---|---|
| 2,623,571 | Webber | Dec. 30, 1952 |
| 2,656,292 | Hoover | Oct. 20, 1953 |

FOREIGN PATENTS

| | | |
|---|---|---|
| 30,589 | Australia | Sept. 14, 1931 |